(12) United States Patent
Hashimoto et al.

(10) Patent No.: US 6,977,881 B2
(45) Date of Patent: Dec. 20, 2005

(54) OPTICAL PICKUP WITH HOLDING MECHANISM TO EFFECTIVELY PREVENT COMATIC ABERRATION

(75) Inventors: Gakuji Hashimoto, Saitama (JP); Hironobu Tanase, Kanagawa (JP); Kenji Yamamoto, Kanagawa (JP)

(73) Assignee: Sony Corporation, (JP)

( * ) Notice: Subject to any disclaimer, the term of this patent is extended or adjusted under 35 U.S.C. 154(b) by 330 days.

(21) Appl. No.: 10/171,775

(22) Filed: Jun. 17, 2002

(65) Prior Publication Data

US 2003/0007445 A1 Jan. 9, 2003

(30) Foreign Application Priority Data

Jun. 18, 2001 (JP) .......................... P2001-183050

(51) Int. Cl.[7] .............................................. G11B 7/12
(52) U.S. Cl. ................................................ 369/112.02
(58) Field of Search ...................... 369/112.02, 112.01, 369/44.15, 44.14, 44.32, 44.16; 359/811, 359/198, 240

(56) References Cited

U.S. PATENT DOCUMENTS

| 5,220,459 | A | | 6/1993 | Ichikawa et al. | |
|---|---|---|---|---|---|
| 5,467,328 | A | * | 11/1995 | Murakami et al. | ........ 369/44.16 |
| 5,663,841 | A | * | 9/1997 | Akiba et al. | ................ 359/814 |
| 5,712,842 | A | | 1/1998 | Yamamoto et al. | |
| 5,926,327 | A | * | 7/1999 | Bae | ............................. 359/824 |
| 5,936,923 | A | * | 8/1999 | Ootaki et al. | ............ 369/53.19 |
| 6,005,834 | A | | 12/1999 | Maeda et al. | |
| 6,034,935 | A | * | 3/2000 | Kim et al. | ................ 369/53.28 |
| 6,084,843 | A | | 7/2000 | Abe et al. | |
| 6,134,195 | A | | 10/2000 | Kawamura | |
| 6,191,889 | B1 | | 2/2001 | Maruyama | |
| 6,826,133 | B2 | * | 11/2004 | Ichimura et al. | ......... 369/44.27 |
| 2001/0019528 | A1 | | 9/2001 | Shiono et al. | |

FOREIGN PATENT DOCUMENTS

| EP | 1 043 615 | | 10/2000 |
|---|---|---|---|
| EP | 1 043 615 | A1 | 10/2000 |
| JP | 2000-131603 | | 5/2000 |
| JP | 2000-215505 | | 8/2000 |
| JP | 2001-266394 | A | 9/2001 |
| JP | 2002-117568 | | 4/2002 |
| WO | WO 00/37982 | | 6/2000 |

OTHER PUBLICATIONS

Electronic translation of JP 2000-117568.*
EPO Search Report Nov. 27, 2003.

* cited by examiner

Primary Examiner—William Klimowicz
Assistant Examiner—Lixi Chow
(74) Attorney, Agent, or Firm—Rader, Fishman & Grauer PLLC; Ronald P. Kananen (57) ABSTRACT

In an optical pickup, an objective lens and an aberration correcting mechanism are held so that they can be moved together.

11 Claims, 9 Drawing Sheets

OPTICAL PICKUP WITH HOLDING MECHANISM TO EFFECTIVELY PREVENT COMATIC ABERRATION

BACKGROUND OF THE INVENTION

1. Field of the Invention

The present invention relates to an optical pickup, and more particularly, to an optical pickup which is applicable to an optical disc device in which an optical disc is accessed by an optical system having a high numerical aperture. The present invention aims to effectively avoid deterioration of the characteristics due to the displacement of an objective lens and an aberration correcting mechanism, by holding the objective lens and the aberration correcting mechanism so that they move together.

2. Description of the Related Art

Hitherto, compact discs and mini discs used for music, DVDs (Digital Versatile Discs) used, for example, for movies, MOs and CDs-R/W used for data recording in computers have been used as optical discs.

In optical disc devices for accessing such optical discs, the wavelength of a laser beam to be applied to the optical disc is decreased and the numerical aperture of an optical system is increased in order to reduce the size of the beam spot formed on the information recording surface of the optical disc, and to further increase the recording density.

However, when an optical disc is accessed with an objective lens having a high numerical aperture, spherical aberration is caused by variations in the thickness of a light transmitting layer of the optical disc. Furthermore, it is usual to increase the numerical aperture of the objective lens by using a so-called two-element objective lens. In this case, spherical aberration is also caused by variations of the distance between the lenses. When the recording capacity is increased by forming the information recording surface of the optical disc of multiple layers, spherical aberration is also caused by these multiple layers.

For this reason, for example, Japanese Unexamined Patent Application Publication No. 2000-131603 proposes an aberration correcting mechanism for correcting such aberrations, in which a lens is interposed between an objective lens and a laser light source so as to correct the wavefront of a laser beam.

In such aberration correction, however, the objective lens and the aberration correcting mechanism may be displaced from each other. In this case, the characteristics are inevitably deteriorated by comatic aberration in the optical pickup.

SUMMARY OF THE INVENTION

The present invention has been made in view of the above problems, and an object of the invention is to provide an optical pickup in which the deterioration of the characteristics due to the displacement of an objective lens and an aberration correcting mechanism can be prevented effectively.

In order to overcome such problems, according to an aspect, the present invention provides an optical pickup having a holding mechanism that holds an objective lens and an aberration correcting mechanism together so that they can be moved by an actuator.

In this case, the aberration correcting mechanism can be precisely positioned relative to the objective lens, and variations can be reduced. It is also possible to prevent the aberration correcting mechanism from being displaced from the objective lens, and to thereby effectively prevent the deterioration of the characteristics due to the displacement of the objective lens and the aberration correcting mechanism.

Preferably, the actuator movably holds the holding mechanism by a plurality of springs, and a driving signal for the aberration correcting mechanism is input via the springs.

This makes it possible to effectively prevent the moving characteristics of the actuator from being deteriorated by the supply of the driving signal via a lead or the like, to simplify the entire configuration, and to reduce the size.

Further objects, features and advantages of the present invention will become apparent from the following description of the preferred embodiments with reference to the attached drawings.

DESCRIPTION OF THE PREFERRED EMBODIMENTS

An embodiment of the present invention will be described in detail below with reference to the attached drawing.

(1) Configuration of the Embodiment

Figure 1:
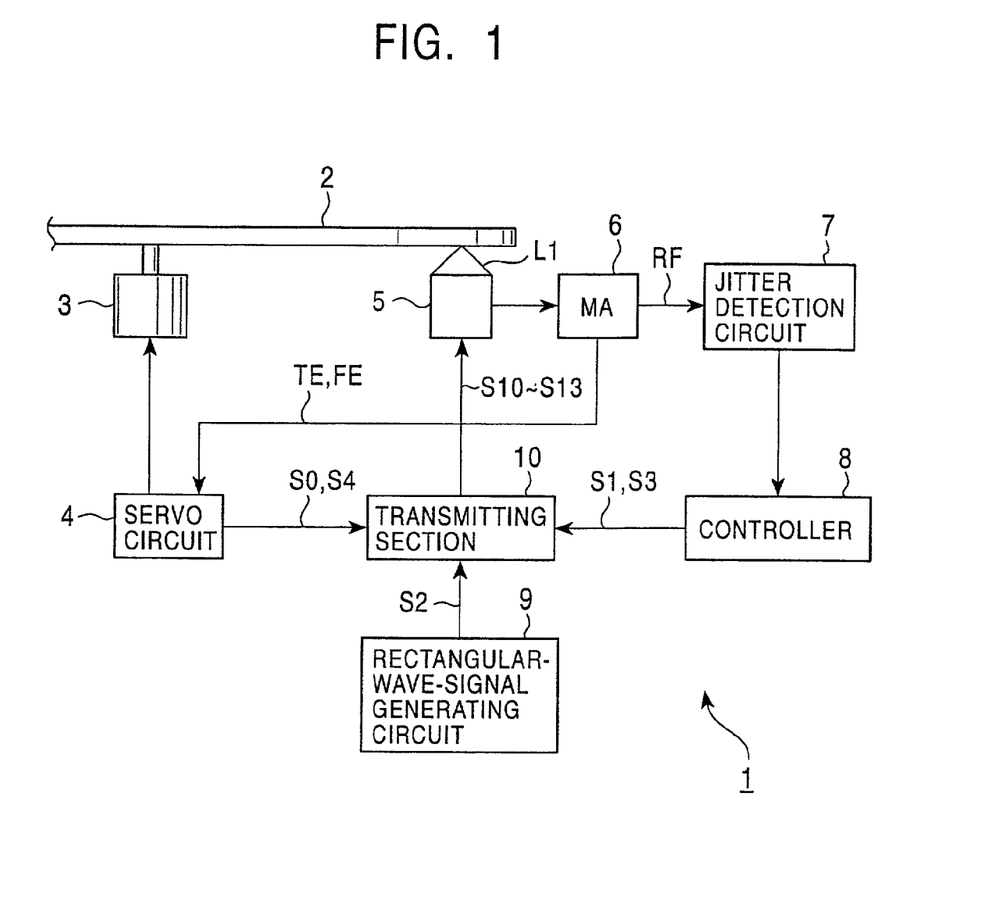
FIG. 1 is a block diagram of an optical disc device according to a first embodiment of the present invention.

FIG. 1 is a block diagram of an optical disc device according to an embodiment of the present invention. In this optical disc device 1, an optical disc 2 is a phase-change optical disc capable of high-density recording. A spindle motor 3 rotationally drives the optical disc 2 at a predetermined rotation speed under the control of a servo circuit 4.

An optical pickup 5 applies a laser beam L1 onto the optical disc 2, receives return light thereof, and outputs the result of the light reception. In the optical disc device 1, a tracking error signal TE and the like are generated by processing the reception result, and data recorded on the optical disc 2 is read. The optical pickup 5 intermittently increases the amount of light of the laser beam L1 to be applied to the optical disc 2 by a driving circuit (not shown), and sequentially produces a string of pits (recording marks) on the optical disc 2 to record desired data thereon.

A matrix circuit (MA) 6 subjects the reception result output from the optical pickup 5 to a matrix operation after current-voltage conversion, and thereby generates a tracking error signal TE whose signal level varies depending on the amount of tracking error, a focusing error signal FE whose signal level varies depending on the amount of focusing error, a wobble signal whose signal level varies with the wobbling of grooves formed on the optical disc 2, a playback signal RF whose signal level varies in accordance with a string of pits formed on the optical disc 2, and the like. In the optical disc device 1, data recorded on the optical disc 2 is read by subjecting the playback signal RF to signal processing.

A jitter detection circuit 7 binarizes and processes the playback signal RF obtained from emboss pits and recording marks on the optical disc 2, and thereby detects and outputs the amount of jitter of the playback signal RF.

A controller 8 controls the operation of the entire optical disc device 1 while executing a predetermined processing procedure. In this control, the controller 8 calculates a control value for an aberration correcting mechanism disposed in the optical pickup 5 on the basis of the jitter detection result obtained from the jitter detection circuit 7, and outputs driving signals S1 and S3 for the aberration correcting mechanism on the basis of the calculation result.

The servo circuit 4 outputs driving signals S0 and S4 for tracking control and focusing control, which are used to drive an actuator disposed in the optical pickup 5, with reference to the tracking error signal TE and the focusing error signal FE.

A rectangular-wave-signal generating circuit 9 generates and outputs a rectangular wave signal S2 having a duty ratio of 50% in which the current level is 0, and having an amplitude sufficiently greater than that of the driving voltage for the aberration correcting mechanism disposed in the optical pickup 5. A transmitting section 10 generates transmission driving signals S10 to S13 by multiplexing the driving signals S0 and S4 for tracking control and focusing control and the driving signals S1 and S3 for the aberration correcting mechanism, and outputs these driving signals S10 to S13 to the optical pickup 5.

In the optical disc device 1, according to the driving signals S10 to S13, the tracking and focusing of the optical pickup 5 are controlled, and the aberration correcting mechanism is driven.

Figure 2:
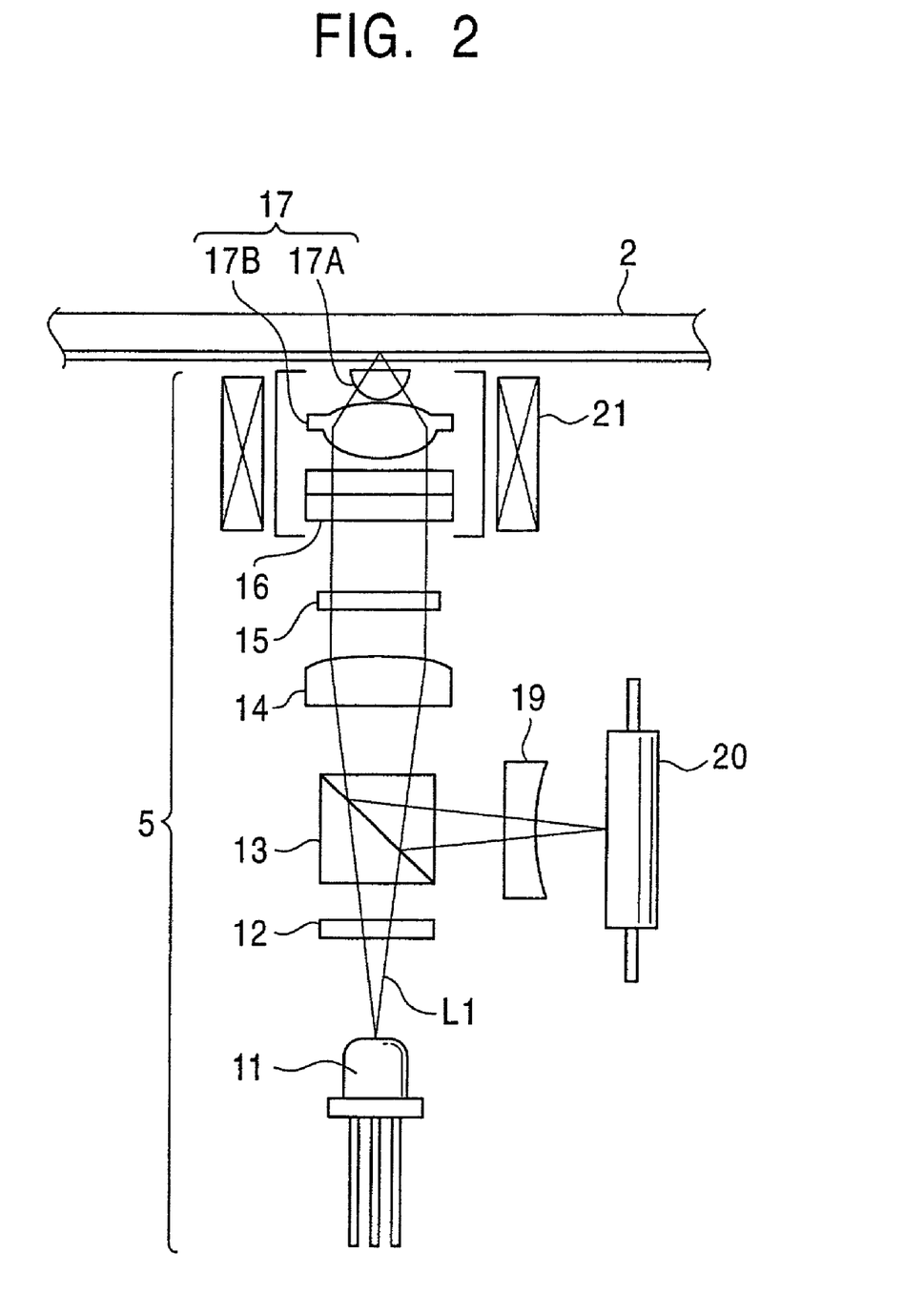
FIG. 2 is a side view of an optical system in an optical pickup that is applied to the optical disc device shown in FIG. 1.

FIG. 2 is a side view showing an optical system of the optical pickup 5. In the optical pickup 5, a laser beam L1 is emitted from a laser diode 11 that forms an integrated circuit with a light-intensity monitoring mechanism, and 0-order and ±1-order diffracted light beams are generated by a grating 12. The laser beam L1 including the 0-order and ±1-order diffracted light beams is transmitted through a subsequent polarization beam splitter 13, is guided to a collimator lens 14, and is converted to a substantially parallel beam by the collimator lens 14. Further, the laser beam L1 is polarized by a subsequent quarter wave plate 15, and is collected onto an information recording surface of the optical disc 2 by an objective lens 17 having a high numerical aperture and composed of two lenses 17A and 17B.

In the optical pickup 5, an aberration correcting mechanism 16 is interposed between the quarter wave plate 15 and the objective lens 17 so as to correct the laser beam L1 for aberrations by using liquid crystal.

By applying the laser beam L1 to the optical disc 2 via such an optical path, return light of the laser beam L1 follows the reverse optical path of the laser beam L1 in the optical pickup 5, and is separated from the optical path of the laser beam L1 by the polarization beam splitter 13.

The return light is processed by a multi-element lens 19, and is then received by a photoreceptor 20 having a plurality of receiving surfaces of a predetermined shape. The optical pickup 5 outputs the reception result of the photoreceptor 20 to the above-described matrix circuit 6. In the optical disc device 1, a tracking error signal TE is generated in a differential push-pull method and a focusing error signal FE is generated in an astigmatism method by processing the return light by the multi-element lens 19, and processing the reception result of the photoreceptor 20 by the matrix circuit 6.

In the optical pickup 5, the objective lens 17 and the aberration correcting mechanism 16 of the optical system having such a layout are held together, and are driven together by an actuator 21 in order to effectively prevent the displacement between the objective lens 17 and the aberration correcting mechanism 16, and to prevent the characteristics from being deteriorated by the displacement.

Figure 3:
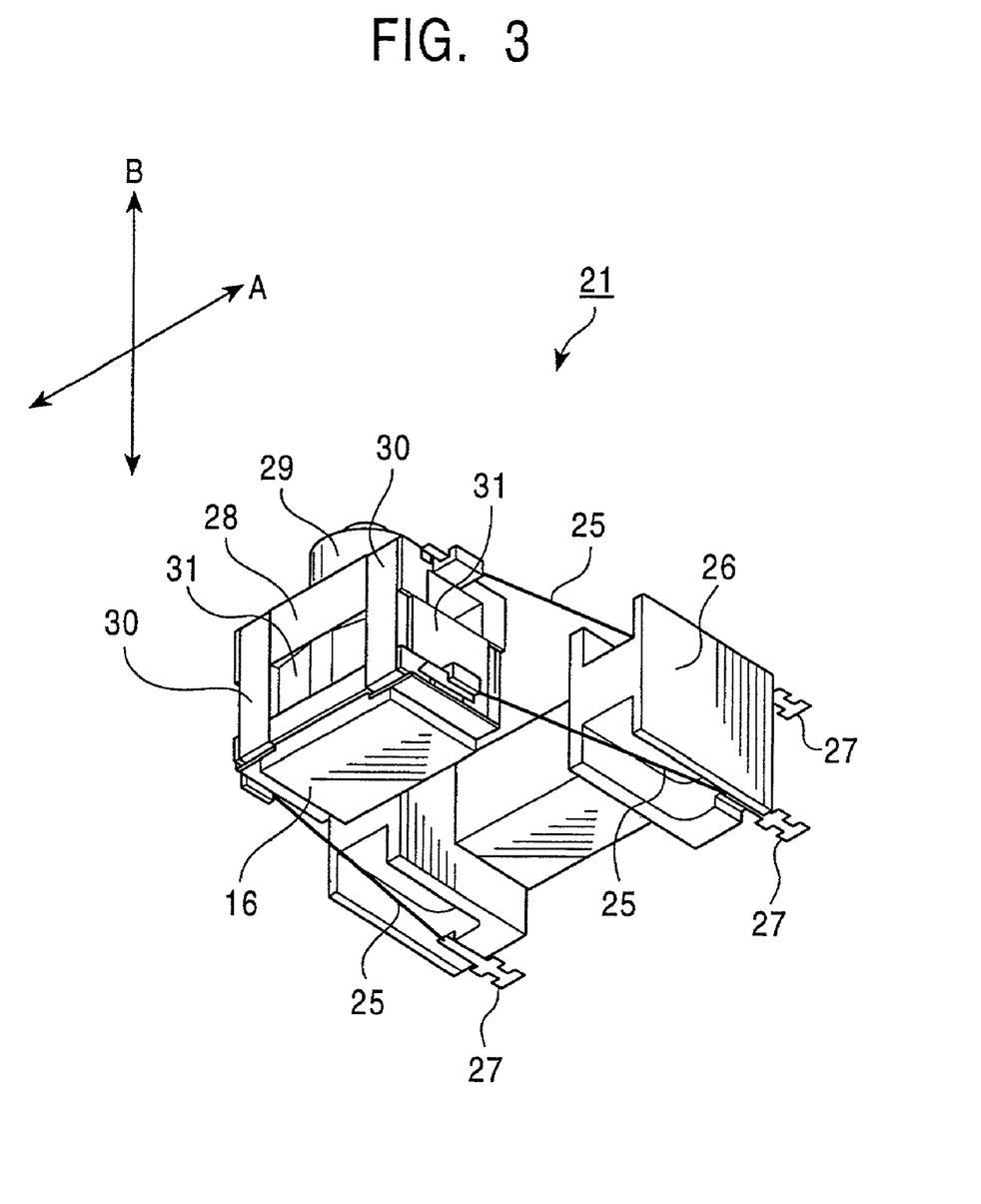
FIG. 3 is a perspective view of an actuator of the optical pickup shown in FIG. 2.
Figure 4A:
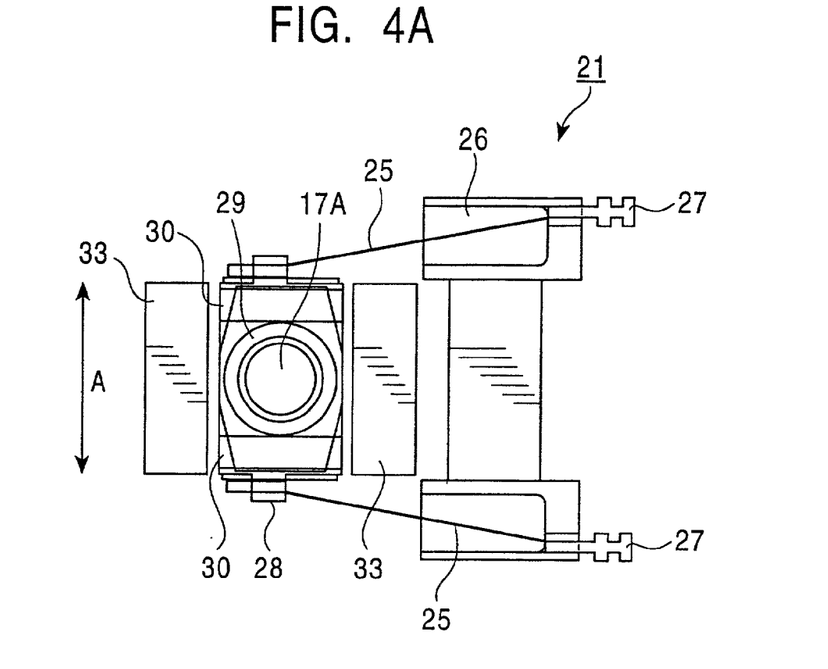
FIGS. 4A and 4B are a plan view and a transparent view, respectively, of the actuator shown in FIG. 3.
Figure 4B:
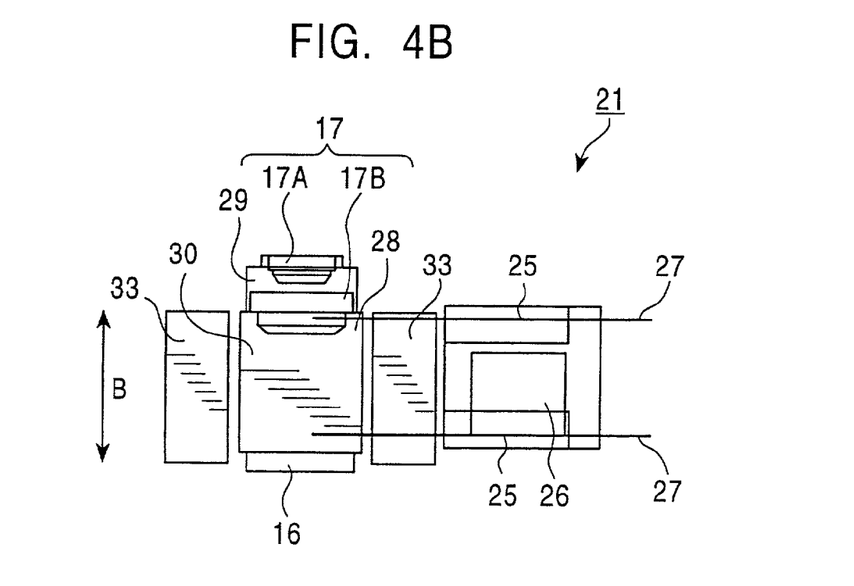

FIG. 3 is a perspective view of the actuator 21 that thus holds the objective lens 17 and the aberration correcting mechanism 16 together, as viewed from the side of the laser diode 11. FIG. 4(A) is a plan view of the actuator 21, as viewed from the side of the optical disc 2, and FIG. 4(B) is a partial sectional transparent side view.

The actuator 21 holds the optical system on a suspension base 26 with suspensions 25 formed of an elongated rodlike spring. The suspension base 26 is a holding member held by a base member of the optical pickup 5, is made of a resin material or the like, and has, on its rear surface, four terminals 27 to which the driving signals S10 to S13 are respectively input. The suspensions 25 are respectively connected to the terminals 27 at one end, and protrude, at the other end, toward the side opposite from the terminals 27.

In the actuator 21, fittings of a bobbin 28 are held at the other ends of the suspensions 25. The bobbin 28 holds the objective lens 17 via a lens holder 29, and also holds the aberration correcting mechanism 16. Further, a tracking coil 30 and a focusing coil 31 are wound on the bobbin 28. The suspensions 25 are thereby bent so that the objective lens 17 and the aberration correcting mechanism 16 can be moved together in various directions.

In the actuator 21, a pair of magnets 33 are placed so as to sandwich the bobbin 28 with a predetermined space therebetween. The tracking coil 30 is driven by the magnets 33 so that the objective lens 17 and the aberration correcting mechanism 16 can be moved together in the radial direction of the optical disc 2, as shown by arrow A, and the focusing coil 31 is driven so that the objective lens 17 and the aberration correcting mechanism 16 can be moved together, as shown by arrow B, in order to change the distance to the optical disc 2.

Figure 5:
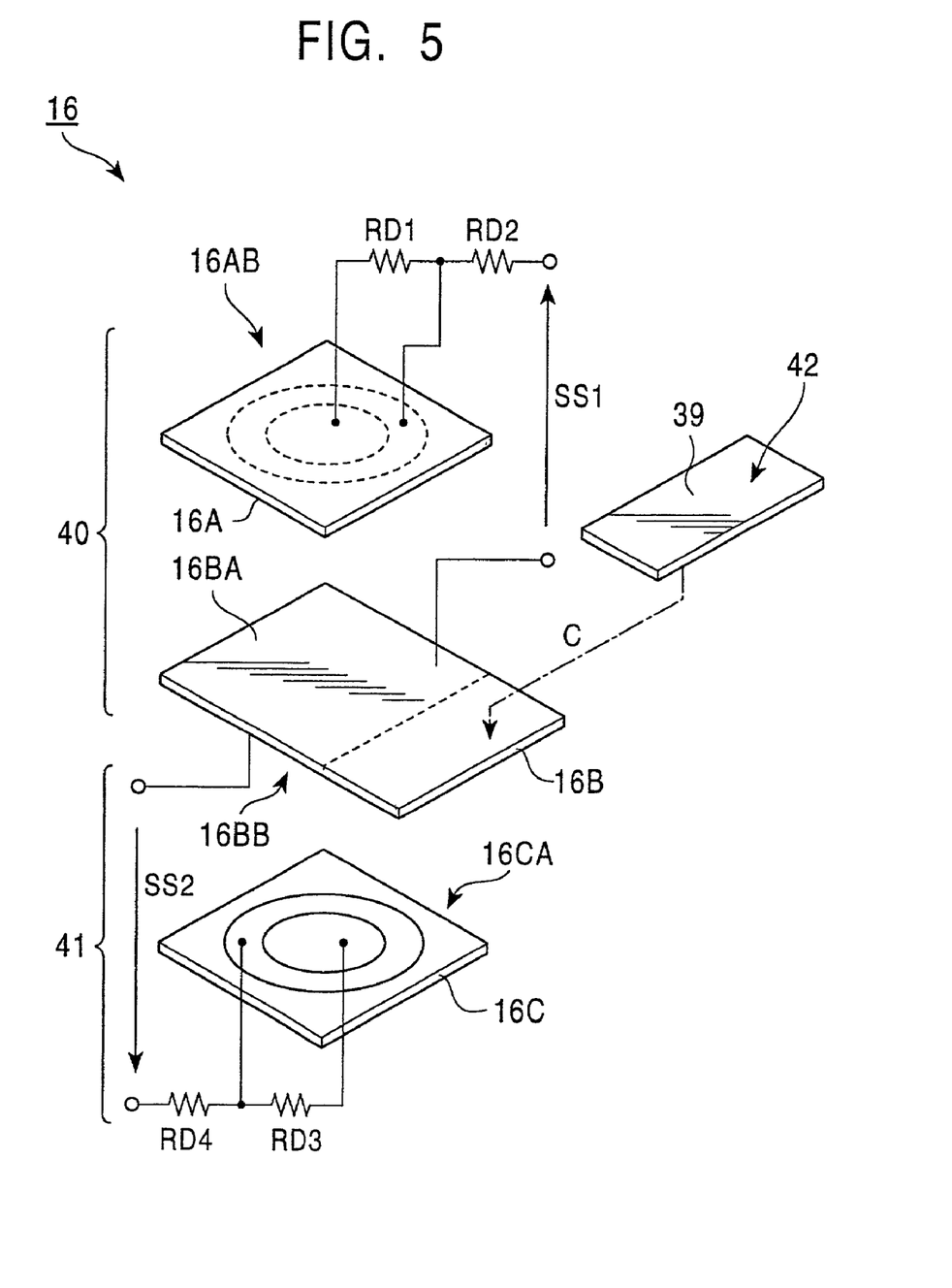
FIG. 5 is an exploded perspective view explaining an aberration correcting mechanism that is applied to the optical pickup shown in FIG. 2.

FIG. 5 is an exploded perspective view showing the structure of the aberration correcting mechanism 16 that is thus held together with the objective lens 17. The aberration correcting mechanism 16 is formed by stacking glass substrates 16A, 16B, and 16C with liquid crystal therebetween. Transparent electrodes 16BA and 16BB are formed on almost the entirety of both surfaces of the center glass substrate 16B, and transparent electrodes 16AB and 16CA are formed on surfaces of the upper and lower glass substrates 16A and 16C opposing the transparent electrodes 16BA and 16BB.

Each of the transparent electrodes 16AB and 16CA includes a circular inner peripheral electrode formed at the center thereof, and a ring-shaped outer peripheral electrode formed so as to encircle the inner peripheral electrode. The inner peripheral electrode and the outer peripheral electrode are subjected to voltage dividing by resistors, and predetermined driving signals SS1 and SS2 are applied between the inner and outer peripheral electrodes and the transparent electrodes 16BA and 16BB of the glass substrate 16B opposed thereto. The wavefront of the laser beam L1 passing through the aberration correcting mechanism 16 is thereby corrected so as to correct aberrations.

In the aberration correcting mechanism 16, the center glass substrate 16B is larger than the upper and lower glass substrates 16A and 16C, and partially protrudes therefrom. A flexible wiring board 39 is placed in the protruding portion, as shown by arrow C.

The flexible wiring board 39 has voltage-dividing resistors RD1 to RD4 for dividing the voltages of the above driving signals SS1 and SS2 mounted thereon, and also a demodulation circuit 42 that generates the driving signals SS1 and SS2 from the driving signals S10 to S13 is mounted thereon. In the optical pickup 5, the driving signals S10 to S13 output from the transmitting section 10 are input to the flexible wiring board 39 via the suspensions 25. The tracking coil 30 and the focusing coil 31 are connected to the flexible wiring board 39. This makes it possible to effectively utilize the flexible wiring board 39 so that the operation of connecting the tracking coil 30 and the focusing coil 31 can be simplified in the optical pickup 5. The voltage-dividing resistors RD1 to RD4 are mounted by effectively utilizing the limited space in the optical pickup 5, and the demodulation circuit 42 for the driving signals SS1 and SS2 is also mounted thereon.

Hereinafter, the assembly of the liquid crystal held by the glass substrates 16A and 16B, and the transparent electrodes 16AB and 16BA and the voltage-dividing resistors RD1 and RD2 corresponding to the liquid crystal will be referred to as "A liquid crystal 40". Similarly, the assembly of the liquid crystal held by the glass substrates 16B and 16C, and the transparent electrodes 16BB and 16CA and the voltage-dividing resistors RD3 and RD4 corresponding to the liquid crystal will be referred to as "B liquid crystal 41".

Figure 6:
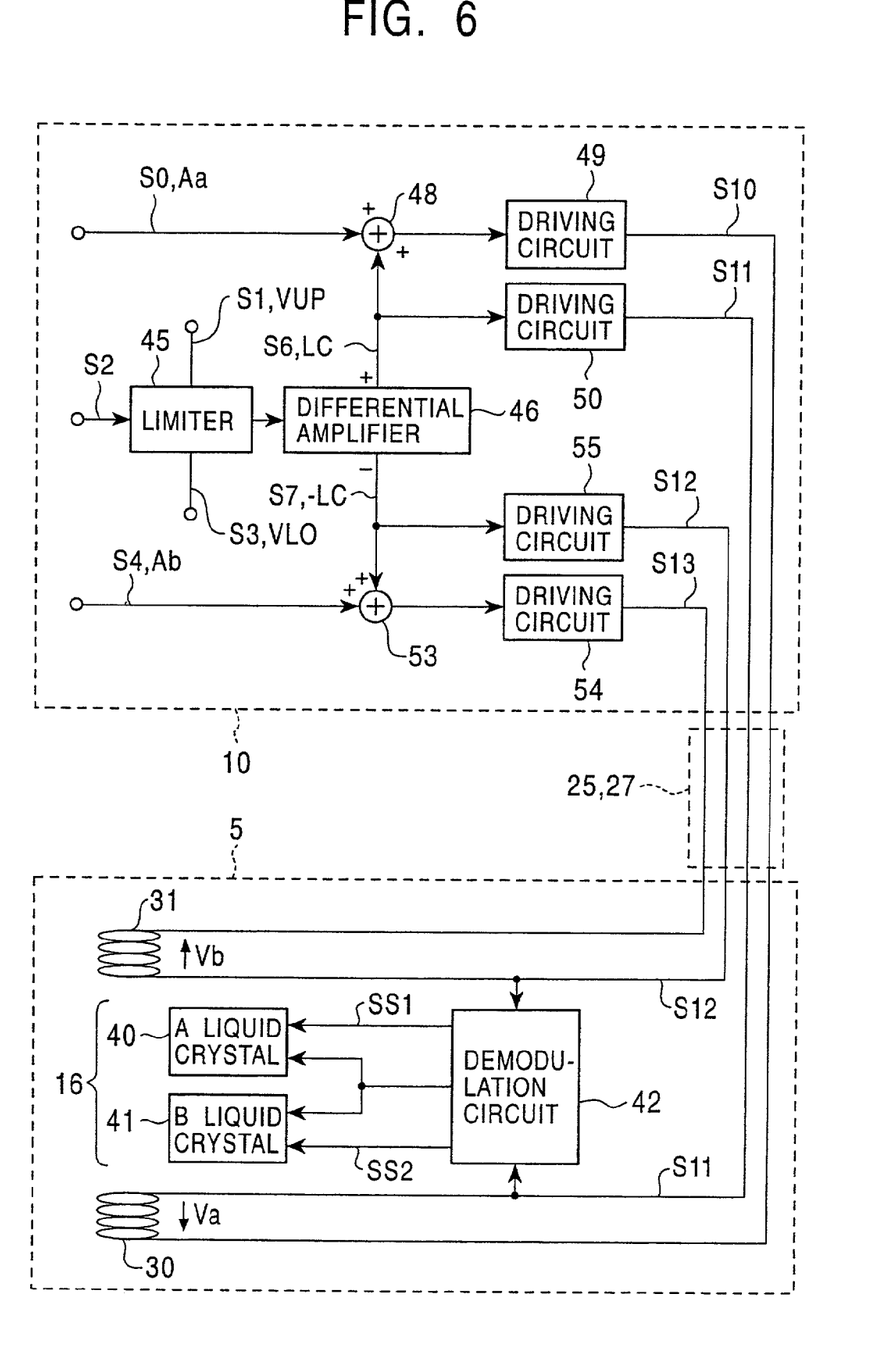
FIG. 6 is a block diagram showing a transmitting section and the optical pickup that are applied to the optical disc device shown in FIG. 1.
Figure 7:
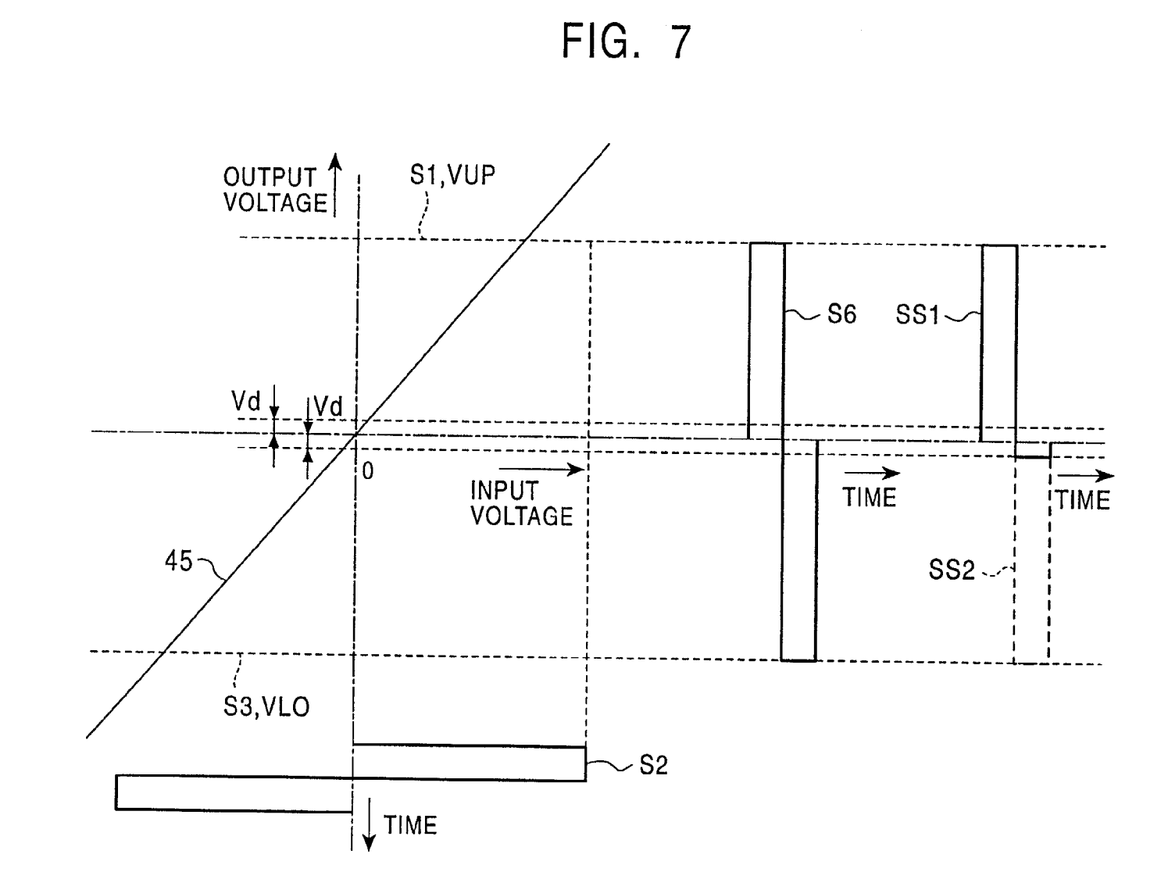
FIG. 7 is a signal waveform chart explaining the transmission of driving signals.

FIG. 6 is a block diagram showing the configuration related to the demodulation circuit 42 that generates the driving signals SS1 and SS2. In the transmitting section 10 of the optical disc device 1, as shown in FIG. 7, a limiter 45 limits a positive amplitude and a negative amplitude of a rectangular wave signal S2 by signal levels VUP and VLO of the driving signals S1 and S3 for the aberration correcting mechanism 16, and outputs the signal. In FIG. 7, Vd represents the ON voltage of diodes D1 and D2 placed in the demodulation circuit 42 which will be described later.

A differential amplifier 46 is a differential amplifying circuit in which a negative differential input terminal is maintained at a fixed voltage, and which receives an output signal from the limiter 45 at a positive differential input terminal, subjects the output signal to differential amplification, and outputs an in-phase output S6 in phase with the input terminal and a negative-phase output S7 whose phase is reversed with respect to the input terminal.

An adding circuit 48 adds the in-phase output S6 to the driving signal S0 for tracking control, which is one of the driving signals for the actuator 21, and outputs the sum thereof. Driving circuits 49 and 50 amplify the output signal from the adding circuit 48 and the in-phase output S6 by corresponding predetermined gains, and output the results. In the optical disc device 1, a pair of output signals S10 and S11 thus obtained are guided to the optical pickup 5 via a pair of lines, and are further transmitted to an object to be moved by the actuator 21 via a pair of lines that are formed by the two pairs of terminals 27 and suspensions 25, of the above-described four pairs of terminals 27 and suspensions 25. Consequently, in the optical disc device 1, a pair of lines for transmitting the driving signal S0 for tracking control are commonly biased in accordance with the driving signal S1 for the aberration correcting mechanism 16 so that the driving signal S0 for tracking control and the driving signal S1 for the aberration correcting mechanism 16 are multiplexed and transmitted.

Similarly, an adding circuit 53 adds the negative-phase output S7 output from the differential amplifier 46 to the driving signal S4 for focusing control, which is the remaining one of the driving signals for the actuator 21, and outputs the sum thereof. Driving circuits 54 and 55 amplify the output signal from the adding circuit 53 and the negative-phase output S7 by corresponding predetermined gains, and output the results. In the optical disc device 1, a pair of output signals S12 and S13 thus obtained are also guided to the optical pickup 5 via a pair of lines, and are transmitted to the object to be moved by the actuator 21 via a pair of lines formed by the remaining two pairs of terminals 27 and suspensions 25, of the above-described four pairs of terminals 27 and suspensions 25. Consequently, in the optical disc device 1, a pair of lines for transmitting the driving signal S4 for focusing control are commonly biased in accordance with the driving signal S3 for the aberration correcting mechanism 16 so that the driving signal S4 for focusing control and the driving signal S3 for the aberration correcting mechanism 16 are multiplexed and transmitted.

Since such signals used for biasing are generated by limiting the positive amplitude and the negative amplitude of the rectangular wave signal S2 having a duty ratio of 50(%) by the signal levels of the driving signals S1 and S3, respectively, and then reversing the polarities thereof, when the driving signals S1 and S3 are transmitted via the two pairs of lines biased in this way, they can be demodulated without reproducing the reference level of the biasing on the side to which the signals are transmitted. Consequently, in the optical disc device 1, even when the aberration correcting mechanism 16 and the objective lens 17 are held and moved together, the driving signal for the aberration correcting mechanism 16 can be transmitted without enlarging the transmission path, and this can reduce the size and weight of the optical pickup 5. Furthermore, it is possible to effectively prevent various characteristics from being deteriorated by the enlargement of the lines.

In the optical pickup 5, the driving signals S10 to S14 thus obtained are received by the above-described flexible wiring board 39, and the lines for the driving signals S10 and S11 and the lines for S12 and S13 are connected to the tracking coil 30 and the focusing coil 31 corresponding thereto, thereby driving the tracking coil 30 and the focusing coil 31 in a common mode for the driving signals S10 and S11, and in a common mode for the driving signals S12 and S13 so as to execute tracking control and focusing control.

That is, when the signal levels of the in-phase output S6 and the negative-phase output S7 are designated Lc and −Lc, and the signal levels of the driving signals S0 and S4 are designated Aa and Ab, the signal levels of the driving signals S10 and S11 are expressed as Aa+Lc and Lc, and the signal levels of the driving signals S12 and S13 are expressed as −Lc and Ab−Lc, respectively. Therefore, the potential difference Va between both ends of the tracking coil 30 is expressed as S10−S11=(Aa+Lc)−Lc. Finally, the tracking coil 30 can be driven at the signal level of the driving signal S0. Similarly, the potential difference Vb between both ends of the focusing coil 31 is expressed as S12–S13=(–Lc)–(Ab–Lc), and finally, the focusing coil 31 can be driven at the signal level of the driving signal S4.

Figure 8:
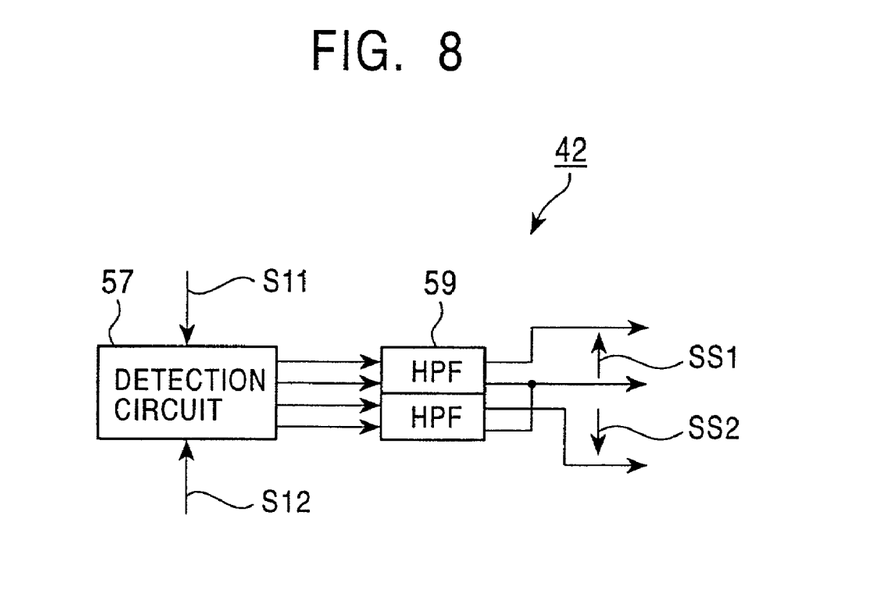
FIG. 8 is a block diagram of a demodulation circuit shown in FIG. 6.

The demodulation circuit 42 generates the driving signals SS1 and SS2 for the A liquid crystal 40 and the B liquid crystal 41 by biasing these lines. That is, as shown in FIG. 8, the driving signals S11 and S12, which are simply biased by the in-phase component S6 and the negative-phase component S7, of the driving signals S11 to S13 are input to a detector circuit 57 in the demodulation circuit 42. The potential difference between the driving signals S11 and S12 corresponds to the signal level with the amplitude limited by one of the driving signals S1 during a period in which the signal level of the rectangular wave signal S2 is HIGH, and to the signal level with the amplitude limited by the other driving signal S2 during a period in which the signal level of the rectangular wave signal S2 is LOW. Therefore, the signal levels of the driving signals S11 and S12 vary depending on the rise and fall of the signal level.

Based on this principle, in the demodulation circuit 42, the driving signals S11 and S12 are detected by the detector circuit 57, thereby generating a positive detector signal and a negative detector signal having peak values corresponding to the positive limit value and the negative limit value of the limiter 45. Then, DC components are cut by subsequent high pass filters (HPF) 58 and 59. Consequently, driving signals SS1 and SS2 are generated, respectively, for the A liquid crystal 40 and the B liquid crystal 41.

Figure 9:
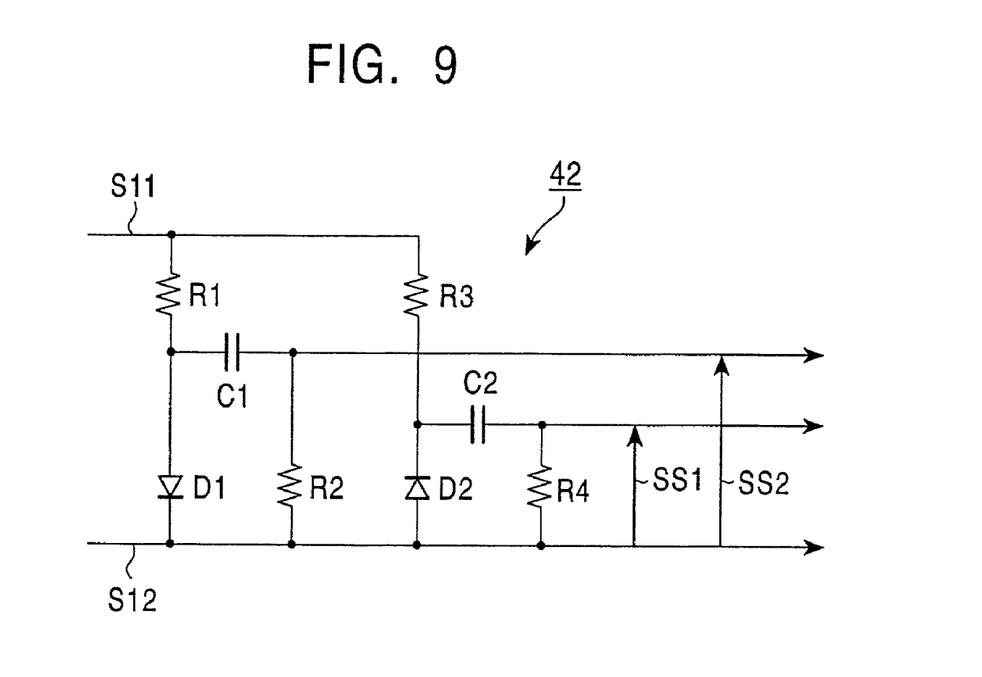
FIG. 9 is a connection view showing the details of the demodulation circuit shown in FIG. 8.

More specifically, the demodulation circuit 42 includes only passive elements that do not need a power supply, as shown in FIG. 9. Therefore, the driving signals SS1 and SS2 can be separated without supplying any power when the driving signals S1 to S4 are multiplied and transmitted in this way in the optical pickup 5.

That is, the driving signals S11 and S12 are applied to both ends of a series circuit formed by a resistor R1 and a diode D1, and the series circuit of the resistor R1 and the diode D1 forms a first detector circuit for detecting the driving signal for the B liquid crystal 41. Similarly, the driving signals S11 and S12 are applied to both ends of a series circuit formed by a resistor R3 and a diode D2 that is reversely connected, and the series circuit of the resistor R3 and the diode D2 forms a second detector circuit for detecting the driving signal for the A liquid crystal 40.

Further, in the demodulation circuit 42, a capacitor C1 and a resistor R2 constitute the high pass filter 59, and a capacitor C2 and a resistor R4 constitute the high pass filter 58.

(2) Operation of the Embodiment

In the optical disc device 1 having the above configuration (FIGS. 2 and 3), desired data is recorded on the optical disc 2 by intermittently increasing the amount of light of the laser beam L1 emitted from the optical pickup 5. The result of reception of return light detected by the optical pickup 5 is processed by the matrix circuit 6 so as to obtain a playback signal RF, and data recorded on the optical disc 2 is read by signal-processing the playback signal RF.

After the laser beam L1 passes through the aberration correcting mechanism 16, it is applied onto the optical disc 2 by the objective lens 17. The wavefront of the laser beam L1 is corrected by the aberration correcting mechanism 16, and spherical aberrations can be prevented even when the laser beam L1 is applied by the objective lens 17 having a high numerical aperture. This makes it possible to record desired data on the optical disc 2 with high density, and to read the data thus recorded.

The aberration correcting mechanism 16 is held together with the objective lens 17 by the bobbin 28 (FIGS. 1 and 4), and is moved together with the objective lens 17 by the actuator 21. This makes it possible to precisely align and maintain the optical axis of the objective lens 17 and the optical axis of the aberration correcting mechanism 16 and to move the aberration correcting mechanism 16 and the objective lens 17 in this state. Consequently, comatic aberrations can be effectively avoided, and the deterioration of the characteristics of the optical pickup 5 can be prevented. Moreover, individual differences of the optical pickups 5 can be made smaller than in a case in which the objective lens 17 and the aberration correcting mechanism 16 are mounted separately. As a result, it is possible to produce high-precision optical pickups that do not vary widely.

Since the aberration correcting mechanism 16 includes the liquid crystal (FIG. 5), an increase in mass of the object to be moved due to the addition of the aberration correcting mechanism can be made smaller than in a case in which the aberration correcting mechanism is formed of lenses. This can prevent the deterioration of the characteristics of the actuator 21.

That is, in the optical disc device 1 (FIG. 2), for example, the amount of jitter is detected by the jitter detection circuit 7 on the basis of a playback signal RF obtained from an emboss pit or a recording mark that is accessed immediately after the optical disc 2 is loaded, and the amount of correction of the aberration is calculated by the controller 8 on the basis of the detection result. Further, the driving signals S1 and S3 of predetermined signal levels for the aberration correcting mechanism 16 are generated on the basis of the correction amount.

In the optical disc device 1, the driving signal S0 for tracking control and the driving signal S4 for focusing control are generated by the servo circuit 4 on the basis of the tracking error signal TE and the focusing error signal FE. These driving signals S1 to S4 are multiplexed by the transmitting section 10, and are transmitted to the optical pickup 5. The multiplexed driving signals are separated on the side of the object moved by the actuator 21 in the optical pickup 5, thereby driving the actuator 21 and the aberration correcting mechanism 16.

In the optical pickup 5 (FIGS. 1 and 4), the suspensions 25 are held at one end by the terminals 27 which are held by the suspension base 26 on the fixed side of the actuator 21, and hold at the other end the objects to be moved, such as the objective lens 17 and the aberration correcting mechanism 16. The magnets 33 are held on the fixed side, and the tracking coil 30 and the focusing coil 31 are placed on the movable side, so that the objective lens 17 and the aberration correcting mechanism 16 are moved together in the optical disc device 1.

Thereby, the objects to be moved are held with a so-called cantilevered structure using four suspensions, and the driving signals for the actuator 21 and the driving signals for the aberration correcting mechanism 16 are multiplexed and supplied via the four suspensions.

This makes it possible to supply these driving signals to the objects to be moved in the optical pickup 5 over the same number of paths as that of the conventional paths for transmitting the driving signals for tracking control and focusing control. Therefore, the objective lens 17 and the aberration correcting mechanism 16 can be held and moved together by the actuator 21 without forming a new path for supplying the driving signals. This makes it possible to reduce the size and weight of the entire device, and to effectively prevent the moving characteristics of the actuator 21 from being deteriorated by a new signal supply line.

Figure 10A:
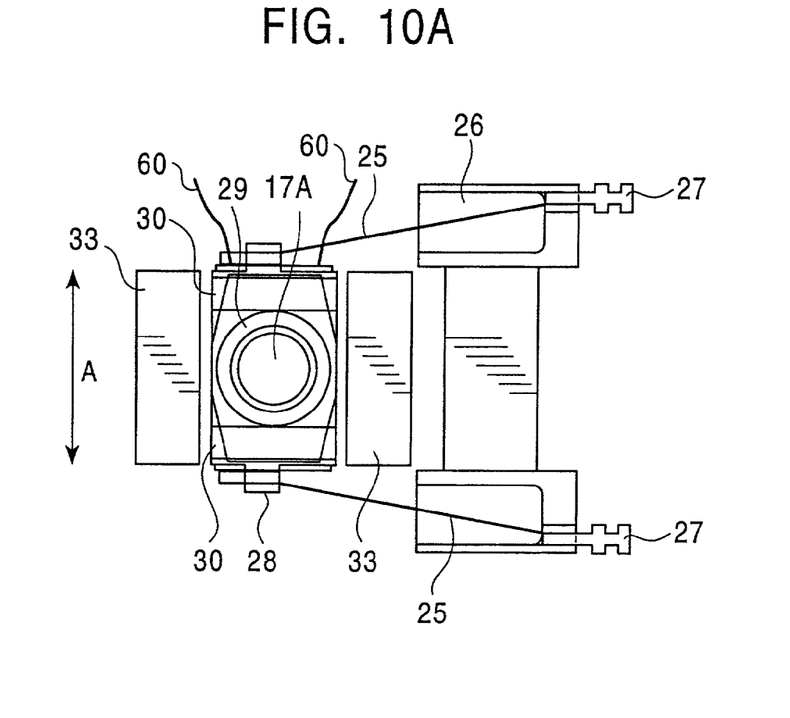
FIGS. 10A and 10B are a plan view and a transparent view, respectively, explaining a case in which driving signals are supplied to the aberration correcting mechanism via leads.
Figure 10B:
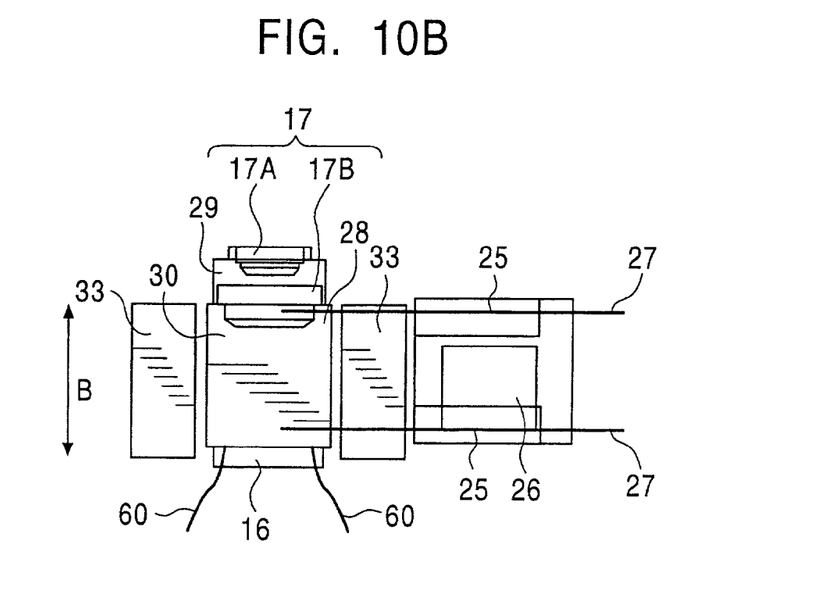

That is, when a case in which driving signals for the aberration correcting mechanism 16 are supplied via added leads is applied to the above configuration described with reference to FIG. 4, the dynamic resistance is increased by leads 60 during the driving of the actuator 21, and the sensitivity of the actuator 21 is thereby decreased, as shown in FIG. 10. Moreover, the skew is substantially changed by changes in tension of the leads 60.

Incidentally, in the actuator of such an optical pickup that records desired data with high density, the depth of focus of the used objective lens is small because the objective lens has a high numerical aperture. For this reason, the actuator is required to have a higher sensitivity for focusing control. Further, since the tracking pitch is reduced, the sensitivity is also required to be increased for tracking control. Therefore, when the driving signals for the aberration correcting mechanism 16 are supplied via the leads 60, as shown in FIG. 10, basic characteristics of the actuator 21 that are required for high-density recording cannot be ensured. It is also thought that a resonance mode caused by vibration of the leads 60 has an adverse influence on the movement by the actuator 21.

In contrast, since the driving signals for the actuator 21 and the driving signals for the aberration correcting mechanism 16 are supplied via the four suspensions in this embodiment, increases in dynamic resistance can be prevented, and changes in tension can also be prevented. This makes it possible to ensure a sufficient sensitivity and to prevent comatic aberrations from being increased by changes of the skew. It is also possible to effectively avoid the influence of the resonance mode caused by vibration of the leads.

The aberration correcting mechanism 16 having such a structure (FIG. 5) is formed by stacking the glass substrates 16A, 16B, and 16C, each having electrodes, with liquid crystal therebetween, the center glass substrate 16B being larger, and the flexible wiring board 39 being placed in the extra portion thereof. In the optical pickup 5, the demodulation circuit 42 for separating the multiplexed driving signals is placed on the flexible wiring board 39, and the flexible wiring board 39 is also used as a lead handling section for the tracking coil 30 and the focusing coil 31. For this reason, in the optical disc device 1, the demodulation circuit 42 is placed by effectively using the limited space in the optical pickup 5, and operations such as an operation of connecting the tracking coil 30 and the focusing coil 31 can be simplified.

When the driving signals S1 to S4 are thus multiplexed and transmitted in the optical disc device 1 (FIG. 1), the rectangular signal wave S2 having a sufficient amplitude and having a duty ratio of 50% is generated by the rectangular-wave-signal generating circuit 9, and the positive amplitude and the negative amplitude of the rectangular wave signal S2 are limited in the limiter 45 by the driving signals S1 and S3 for the aberration correcting mechanism 16. Further, the in-phase output S6 in phase with the output signal from the limiter 45 and the negative-phase output S7 whose phase is reversed with respect thereto are generated by the differential amplifier 46.

In the optical disc device 1, a pair of lines used to transmit the driving signal S0 for tracking control in the adding circuit 48 and the driving circuits 49 and 50 are commonly biased in accordance with the in-phase output S6, and one driving signal S1 for the aberration correcting mechanism 16 is thereby multiplexed with the driving signal S0 for tracking control. Similarly, a pair of lines used to transmit the driving signal S4 for focusing control in the adding circuit 53 and the driving circuits 54 and 55 are commonly biased in accordance with the negative-phase output S7, and the remaining driving signal S3 for the aberration correcting mechanism 16 is thereby multiplexed with the driving signal S4 for focusing control.

These lines are guided to the flexible wiring board 39 via the terminals 27 and the suspensions 25, and the commonly biased lines are connected to the tracking coil 30 and the focusing coil 31 corresponding thereto.

Consequently, the tracking coil 30 and the focusing coil 31 can be driven by the driving signals S0 and S4 for tracking control and focusing control without being influenced by the driving signals S1 and S3 for the aberration correcting mechanism 16.

On the other hand, the potential difference between the lines simply biased by the in-phase output S6 and the negative-phase output S7 is detected by the first and second detector circuits in which the diodes D1 and D2 are oriented in opposite directions in the demodulation circuit 42 (FIGS. 8 and 9), and the positive amplitude and the negative amplitude set by the limiter 45 are thereby reproduced. Further, the DC components are cut by the high pass filters. The A liquid crystal 40 and the B liquid crystal 41 are driven in response to the outputs from the high pass filters, respectively, and the wavefront of the laser beam L1 passing through the A liquid crystal 40 and the B liquid crystal 41 can be thereby corrected to correct aberrations.

(3) Other Embodiments

While the demodulation circuit is composed of only passive elements in the above embodiment, the present invention is not limited thereto, and the demodulation circuit may include an active element, as required. In this case, it is possible to perform transmission while superimposing the power supply on the signal lines, and to demodulate the driving signals by various methods, instead of the demodulation by the detection using the diodes. Various multiplexing methods may be widely adopted.

While the wavefront of the laser beam is corrected while centered on the optical axis in the aberration correcting mechanism by concentrically forming the transparent electrodes in the above embodiment, the present invention is not limited thereto, and is widely applicable to various cases for wavefront correction, for example, a case in which the wavefront is corrected in the inner and outer peripheral directions of the optical disc.

While the aberration correcting mechanism includes a pair of liquid crystal layers in the above embodiment, the present invention is not limited thereto, and is also applicable to a case in which driving signals are transmitted with the aberration correcting mechanism provided with more liquid crystal layers, and a case in which driving signals are transmitted with the aberration correcting mechanism provided with various correcting structures other than the liquid crystal.

While the optical pickup has a so-called cantilevered structure using four suspensions in the above embodiment, the present invention is not limited thereto, and is also applicable to optical pickups having various holding mechanisms, for example, a case in which the optical system is movably held from both sides by base members placed on both sides of the optical system.

While the transmitting section is placed outside the optical pickup in the optical disc device of the above embodiment, the present invention is not limited thereto, and for example, the transmitting section may be placed on the fixed side of the optical pickup.

While the driving signals for the aberration correcting mechanism are generated by detecting the amount of jitter in the above embodiment, the present invention is not limited thereto, and is also widely applicable to various cases in which driving signals are generated, for example, a case in which an envelope of the playback signal RF is detected and driving signals for the aberration correcting mechanism are generated in accordance with the level of the envelope.

While a so-called opened magnetic actuator, in which the tracking coil and the focusing coil are placed between the opposing magnets, is adopted in the above embodiment, the present invention is not limited thereto, and is also applicable to a case in which a closed magnetic actuator having yokes placed opposed to corresponding magnets is adopted.

While the phase-change optical disc is accessed in the above embodiment, the present invention is not limited thereto, and is widely applicable to optical pickups of optical disc devices that access various types of optical discs.

As described above, in the present invention, since the objective lens and the aberration correcting mechanism are held so as to move together, the characteristics can be effectively prevented from being deteriorated by the displacement of the objective lens and the aberration correcting mechanism.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical pickup that exerts at least tracking control and focusing control by moving an objective lens by an actuator, said optical pickup comprising:
   an objective lens for collecting a laser beam onto an optical disc;
   an aberration correcting mechanism for correcting a wavefront of the laser beam incident on said objective lens; and
   a holding mechanism for holding said objective lens and said aberration correcting mechanism together so that said objective lens and said aberration correcting mechanism are moved by said actuator,
   wherein said actuator has a plurality of springs that movably hold said holding mechanism, and
   wherein a driving signal for said aberration correcting mechanism is input via said springs.

2. An optical pickup according to claim 1, wherein said aberration correcting mechanism has liquid crystal that is driven to correct the wavefront of the laser beam.

3. An optical pickup according to claim 1, wherein a driving signal for said actuator is input via said springs.

4. An optical pickup according to claim 1, wherein said springs are supported at only by a suspension base.

5. An optical pickup according to claim 1, wherein said laser beam is emitted from a laser beam source along an optical path, said aberration correcting mechanism being disposed along said optical path between said laser beam source and said objective lens.

6. An optical pickup according to claim 1, wherein said laser beam passes through said aberration correcting mechanism.

7. An optical pickup according to claim 1, wherein said objective lens is composed of two lenses.

8. An optical pickup according to claim 1, wherein said aberration correcting mechanism is structurally adapted to receive said driving signal via said springs.

9. An optical pickup according to claim 1, wherein a holding mechanism holds a tracking coil and a focusing coil together with said objective lens and said aberration correcting mechanism, a tracking coil driving signal for said tracking coil and a focusing coil driving signal for said focusing coil being input via said springs.

10. An optical pickup according to claim 9, wherein said plurality of springs including a first spring and a second spring:
    said tracking coil is structurally adapted to receive said tracking coil driving signal via said first springs,
    said aberration correcting mechanism is structurally adapted to receive said driving signal via said first spring,
    said focusing coil is structurally adapted to receive said focusing coil driving signal via said second spring, and
    said aberration correcting mechanism is structurally adapted to receive another driving signal via said second spring.

11. An optical pickup according to claim 10, wherein said plurality of springs further including a third spring and a fourth spring:
    said tracking coil is structurally adapted to receive another tracking coil driving signal via said third spring, and
    said focusing coil is structurally adapted to receive another focusing coil driving signal via said fourth spring.

* * * * *